Aug. 14, 1962 H. L. HAYES 3,049,146
REGULATOR FOR CONSTANT VOLUME CONTROL OF GAS FLOW
Filed Dec. 22, 1958
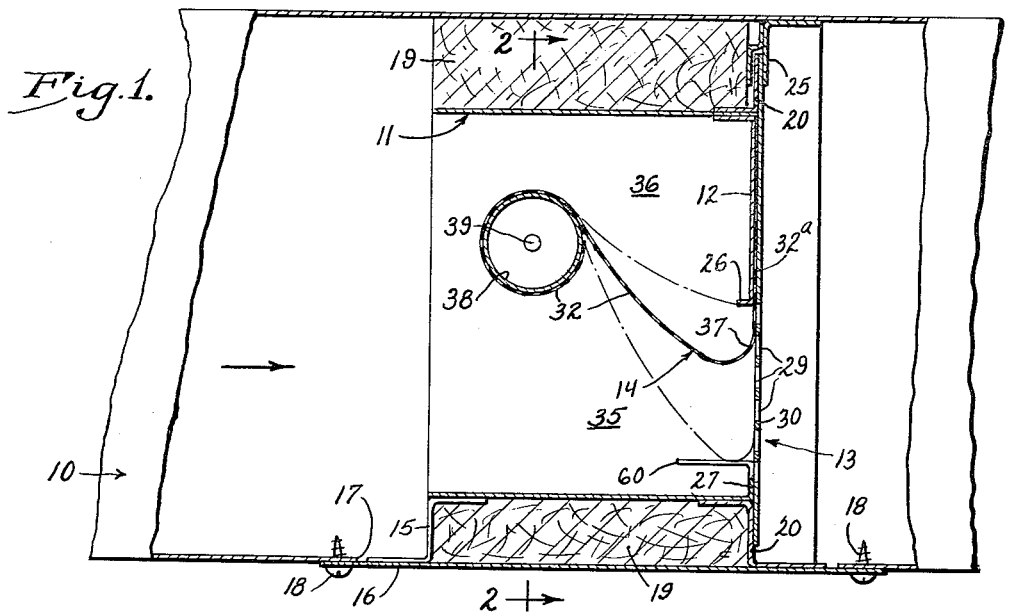
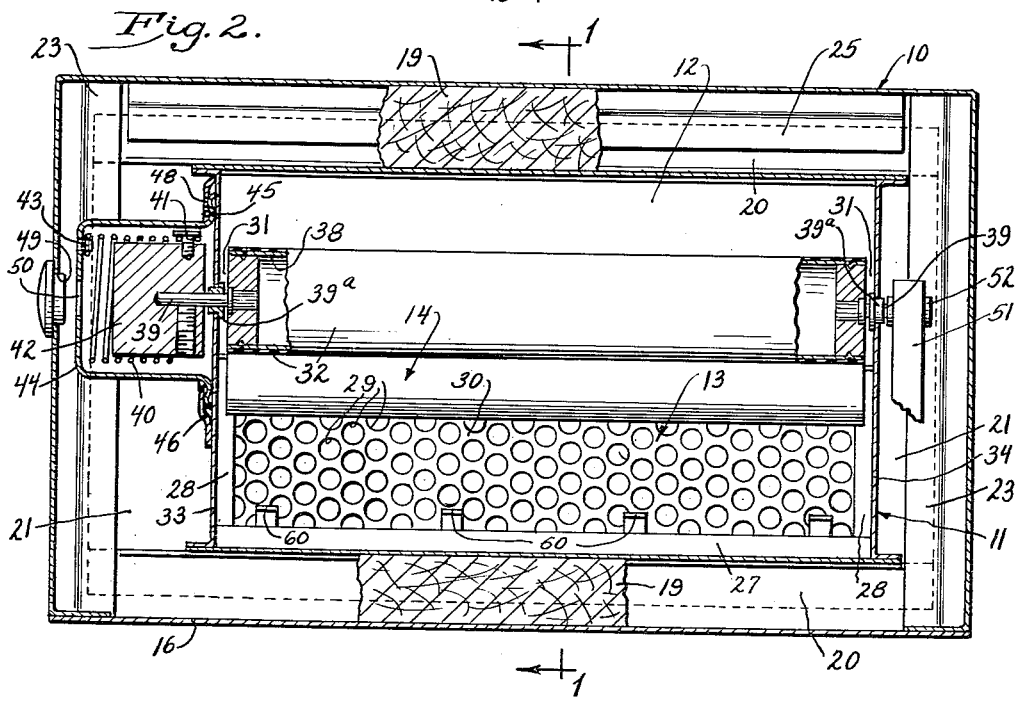
INVENTOR.
Harold L. Hayes
BY
Carlson, Pitzner, Hubbard & Wolfe
ATTORNEYS

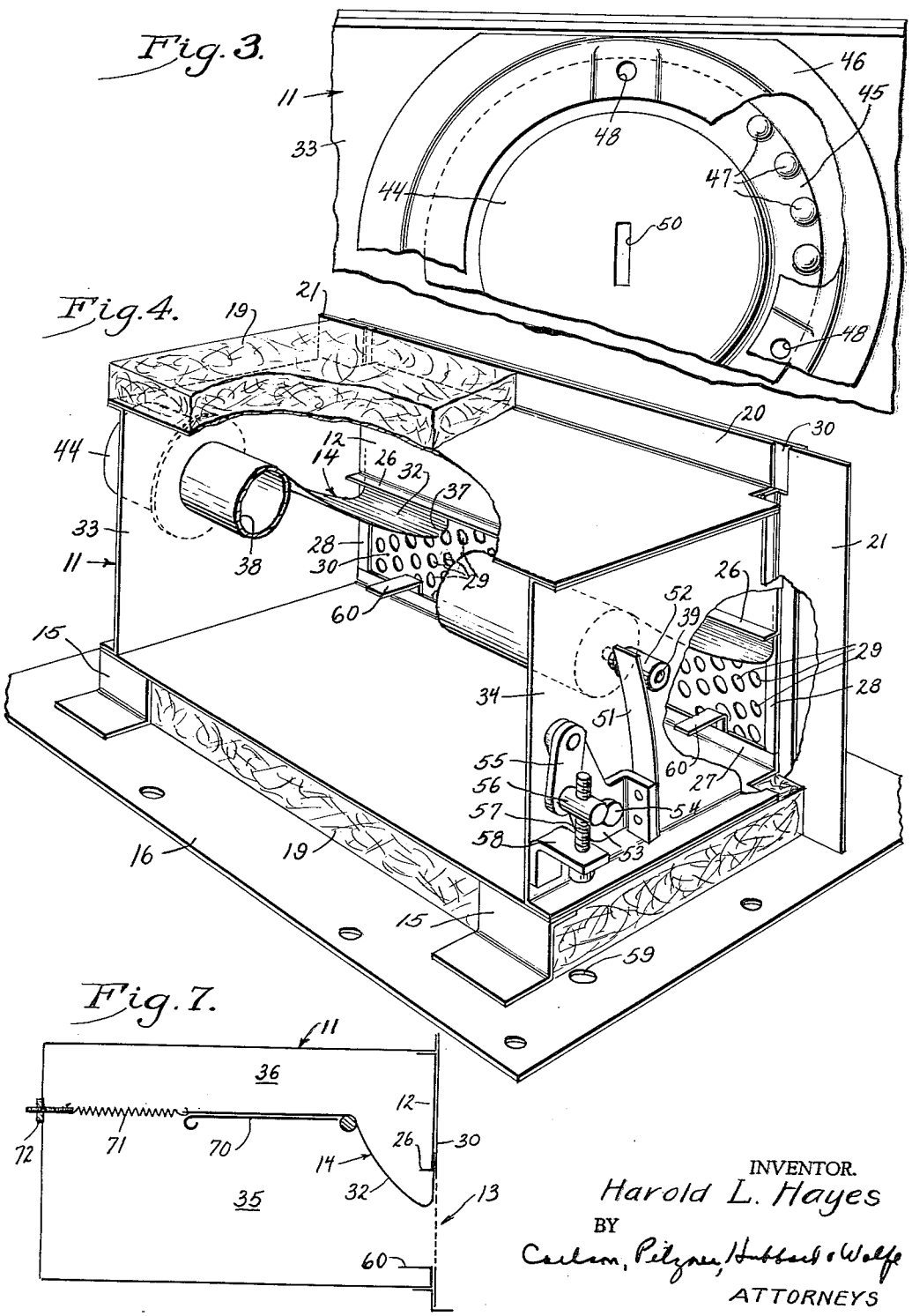

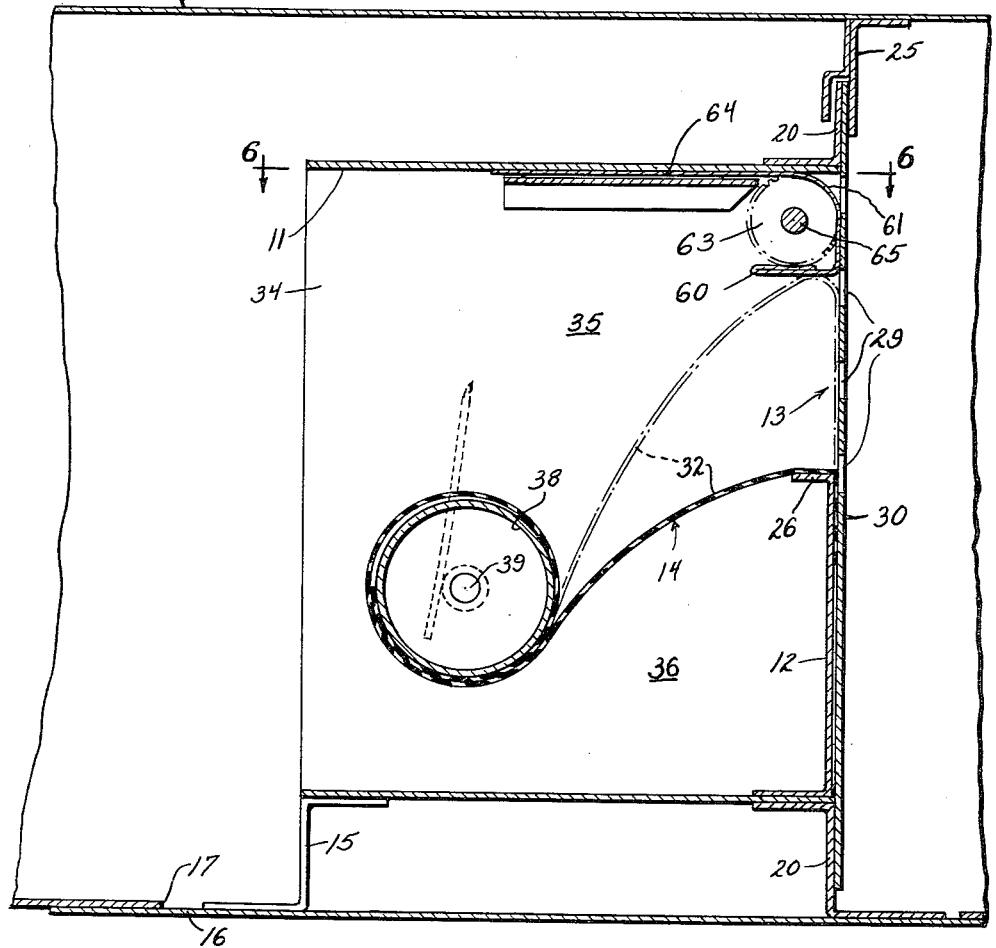
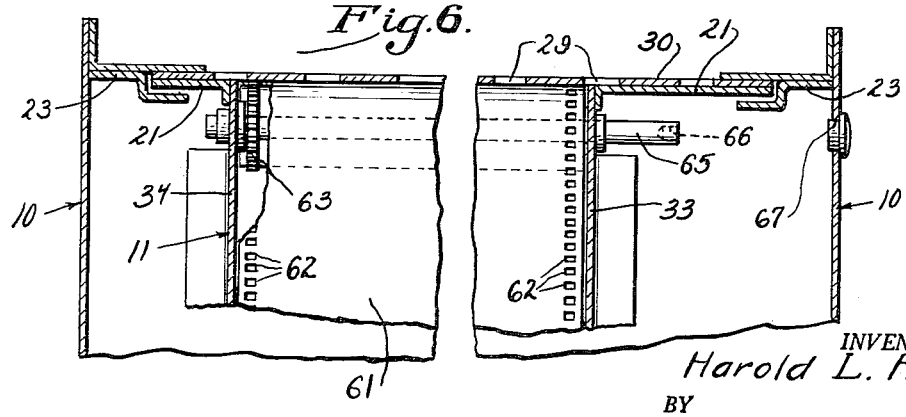

United States Patent Office 3,049,146
Patented Aug. 14, 1962

3,049,146
REGULATOR FOR CONSTANT VOLUME CONTROL OF GAS FLOW
Harold L. Hayes, Winnebago, Ill., assignor to Barber-Colman Company, Rockford, Ill., a corporation of Illinois
Filed Dec. 22, 1958, Ser. No. 782,184
5 Claims. (Cl. 137—517)

This invention relates to a regulator to automatically control the flow of gas through a duct to maintain a constant volume delivery in spite of variations in the pressure differential inducing the flow through the duct.

As compared to prior devices for this purpose, the general object of the invention is to provide a regulator which is simpler in construction, more efficient and accurate in compensating for pressure variations, and is more easily adjustable for different flow rates.

A further object is to effect the flow restriction by a novel construction and arrangement of a valve member extending lengthwise of the duct so that a large pressure area may be obtained for a duct of given cross sectional area.

Another object is to effect the flow restriction by variable lateral bulging of a flexible curtain fixed at one end to the duct and extending upstream to a rotary shaft around which the curtain is wrapped and turned under a torque which balances the static pressure drop across opposite sides of the unsupported length of the curtain.

The invention also resides in the novel manner of actuating and mounting the curtain to prevent fluttering thereof and to adjust the flow rate through the duct.

Other objects and advantages of the invention will become apparent from the following detailed description taken in connection with the accompanying drawings, in which FIGURE 1 is a longitudinal sectional view of an air duct equipped with a regulator embodying the novel features of the present invention, the section being taken on the line 1—1 of FIG. 2.

FIG. 2 is a fragmnetary section taken along the line 2—2 of FIG. 1.

FIG. 3 is a fragmentary end view of the spring housing locking arrangement.

FIG. 4 is a perspective view of the regulator per se.

FIG. 5 is a view similar to FIG. 1 showing a modification.

FIG. 6 is a fragmentary section taken along the line 6—6 of FIG. 5.

FIG. 7 is a fragmentary schematic view similar to FIG. 1 showing a modified form of the regulator.

As shown in the drawings, the improved flow regulator is preferably a unitary assembly (FIG. 4) adapted to be mounted within a duct 10 through which air under pressure is forced in the direction of the arrow in FIG. 1. Generally stated, the unit includes a box-like frame 11 of rectangular cross section somewhat smaller than the main duct and itself constituting a short duct opening over its entire cross section at the inlet end and at its downstream end is closed by an imperforate partition 12 over part of the cross section so as to leave an opening 13 for the free flow of air therethrough. The area of the latter is controlled in a novel manner by a valve member 14 movable automatically in response to changes in the supply pressure to maintain a constant volume of air flow through the duct outlet.

In the present instance, the frame 11 or inner duct is supported by feet 15 on a base plate 16 and inserted sidewise through a hole 17 (FIG. 1) in the bottom wall of the main duct 10, the plate being clamped removably against the latter by screws 18. The areas between the frame and the opposed walls of the main duct are blocked by sound insulating material 19 and flanges 20 above and below the frame and by flanges 21 at opposite sides of the frame. During insertion of the unit 11 through the hole 17, the side flanges 21 are received in and slide along channels 23 fixed to the side walls of the main duct. In the final position of the unit, the top flange 20 is received in a similar channel 25 depending from the top wall of the main duct.

The opening 13 at the outlet end of the inner duct is defined by flanges 26 and 27 on the partition plate 12 and the bottom of the frame 11 and by narrow strips 28 spanning these flanges at the vertical margins of the frame. For a purpose to appear later, the opening is formed by a multiplicity of closely spaced holes 29 in a plate 30 lying adjacent the plate 12 and the flange 27. It will be apparent that the opening or the combined area of the holes 29 constitutes a restriction substantially smaller in area than the cross section of the inner duct 11. When a gas is forced under a pressure difference to flow through a conduit having such a restriction therein, it is well known that the velocity of the flow within the restriction is increased above the velocity at the inlet end of the conduit and that such increase in velocity is accompanied by a corresponding reduction in pressure within the restriction as compared with the pressure at the inlet.

The present invention utilizes this well known phenomenon and the pressure differential thus developed within the duct to actuate the valve member 14 and respectively reduce and enlarge the area of the opening 13 as the inlet pressure in the case of an air supply duct increases and decreases or the outlet pressure in the case of an exhaust duct decreases and increases. In each instance, the change in the passage area is just sufficient to compensate for the pressure change so as to maintain a constant volumetric rate of delivery of the gas through the duct outlet over the full range of variation of the motivating pressure in a given installation.

To obtain ample force for positioning the valve member accurately under relatively small changes in the pressure differential, the latter its exerted over a large area. In accordance with the present invention, this area is provided by the valve member itself which, although adapted to move transversely of the duct to vary the number of holes 29 exposed, actually extends longitudinally of the duct thereby avoiding enlargement of the duct cross section in accommodating an actuator of the desired large area.

To the foregoing ends, the valve member 14 and its actuator comprise an elongated flexible imperforate sheet 32 preferably disposed, generally horizontally, between the top and bottom walls of inner duct and substantially spanning the side walls 33 and 34 thereof while extending in the upstream direction away from the perforated plate. The sheet fit is only slightly narrower than the duct, side clearances 31 on the order of one-fourth of an inch having been found satisfactory. The sheet thus defines the inner or upper wall of a passage 35 leading downstream to the opening 13. The upper side of the sheet cooperates with the upper and side walls of the duct 11 to form a chamber 36 which extends longitudinally of the duct and opens upstream. At its downstream end, this chamber is closed by the plate 12 and, as will presently appear, by part of the sheet 32.

To provide the desired strength and flexibility, the sheet is preferably composed of strong synthetic fabric impregnated or coated with resinous material such as rubber to produce a thickness of about .010 of an inch. One end portion 32$^a$ is clamped between the plates 12 and 30 so that the adjacent portion hangs downwardly covering part of the holes 29 in the plate 30. The latter thus constitutes a backing for the curtain which is made narrower than the duct but wide enough to overlap the flanges 28 at the sides of the perforated opening.

Intermediate its ends, the curtain bends as indicated at 37 away from the plate 30 and extends upstream in a generally horizontal direction. Its other end portion is mounted for endwise movement along the duct to vary the length of the intervening or unsupported length of the curtain. Preferably this is accomplished by securing the extreme end of the sheet to and winding a length of sheet around a shaft or roller 38 extending transversely of the duct 11 at a level somewhat above the upper edge 26 of the opening 13 and having end trunnions 39 journaled in bearings 39a in the side walls 33 and 34 of the duct. The fastening of the sheet to the roller may be effected conveniently by a suitable adhesive or by some mechanical clamping means.

The force for tensioning the unsupported length of the curtain is derived in the preferred embodiment from a torsion spring 40 wound around the extended end of one roller trunnion and secured at 41 to a disk 42 fast on the trunnion. The other spring end is anchored at 43 to the bottom of a cup 44 telescoped over the spring and having an out-turned lip 45 held against the wall 33 by the inner yieldable edge of a ring 46 welded against the wall. The cup is thus adapted for angular adjustment about the roller axis to vary the tensioning of the spring and therefore the biasing force tending to wind up the sheet on the roller.

The angular adjustment of the cup is maintained by a suitable detent which herein takes the form of angularly spaced dimples 47 (FIG. 3) formed in the cup lip 45 for engagement with holes 48 punched in the ring 46. Access to the cup for adjusting the spring is had through a hole 49 formed in the wall of the main duct in alinement with the roller axis and normally filled by a removable plug. A suitable tool such as a screw driver projected through the hole may be inserted in a slot 50 in the bottom of the cup and turned to overcome the detenting action of the dimples in the holes and turn the cup in the direction required for effecting the desired change in the curtain tension. In this way, the regulator may be adapted for operation over a wide range of supply pressures.

Means is provided for overcoming any tending of the unsupported length of the curtain to flutter up and down in service use. Such fluttering is accompanied by angular oscillation of the roller 38 which herein is resisted by applying a friction damping force to the other extended roller trunnion 39. To this end, the free end of a leaf spring 51 bears against the periphery of the trunnion or in this instance a drum 52 fast thereon. As shown in FIG. 4, this spring is anchored cantilever fashion on one end of a bell crank 53 fulcrumed at 54 on the duct wall 34 and having an upright arm joined by a link 55 to a nut 56. The latter threads onto a screw 57 journaled in a bracket 58 and having a head accessible through a normally plugged hole 59 in the base plate 16. By turning the screw, the bending of the spring 51 may be varied to produce the friction damping force required for preventing vibration of the curtain under given operating conditions.

It will be apparent that the curtain forms a partition which separates the chambers 35 and 36 and is free to move broadwise along the side walls 33 and 34 and bulge downwardly different amounts according to the length of curtain which is unwound at any time from the roller. Such variable bulging, as shown by the full and dot-dash lines in FIG. 1, corresponds at any time to the pressure differential then existing between the chambers 35, 36 due to the orifice action above described. Under each pressure condition, the curtain will unwind until the total pressure acting downwardly on the upper surface of the curtain balances the opposing force of the spring 40. The total actuating force due to the pressure differential is relatively large owing to the comparatively large curtain area on which it acts. In view of this, leakage of air between the chambers 35, 36 through the narrow clearances 31 does not offset the pressure differential appreciably.

Under each different pressure differential, the curtain is forced to take a corresponding bulge or equilibrium position of a definite shape. In each bulge, part of the unsupported length of the curtain immediately below the lower edge of the plate 12 is pressed against the perforated plate 30 and the overlapped side strips 28 thus covering a corresponding number of the holes 29. Thus, as the supply pressure changes the covering and uncovering of the holes and therefore the area of the opening 13 will be changed in the proper direction and by an amount such as to compensate for the change in the velocity of the air flow through the opening, which velocity change accompanies the existing change in the supply pressure. As a result, the volumetric rate of flow through the duct may be held constant within very close limits.

To insure proper separation of the two chambers 35 and 36 and the use of the restricted opening 13 in developing the pressure differential for actuating the control valve, means is provided for limiting the unwinding of the curtain so as to prevent complete closure of the opening when the air supply pressure is increased to an abnormally high value. Herein, this means comprises a plurality of stop bars 60 projecting upstream from the perforated plate 30 and spaced a short distance above the flange 27 to which the bars may be secured. With several such bars spaced across the opening for engagement with the curtain where it bends away from the plate 30, the downward bulging of the curtain will be limited as shown by the lower dot-dash outline in FIG. 1.

In the event that the supply of air is interrupted, the resulting fall in pressure in the upper chamber 36 will allow spring 40 to draw the curtain taut. This condition is shown by the upper dot-dash line in FIG. 1, the curtain then bending away from the flange 26 and the opening 13 being of maximum area.

Adjustment of the regulator for the maintenance of different selected flow rates may be effected in other ways than by adjustment of the wind-up spring 40. For example, as shown in FIGS. 5 and 6, the stops 60 for limiting the bulging of the curtain may be mounted for adjustment in unison in the direction of bulging thereby varying the area of the restricted opening 13 relative to the fixed tension in the curtain provided by the spring 40. Such a mounting may be accomplished by securing the stop bars to the end of a flexible sheet 61 perforated along its side edges as indicated at 62 to mesh with the teeth of sprockets 63 around which the sheet is extended into a guideway 64 lying alongside the outer side of the chamber 35. The sprockets are fast on a shaft 65 journaled in and projecting through the side walls 33 and 34 of the duct and formed at one end with a recess to receive a tool inserted through a hole 67 in a wall of the main duct 10. By turning the shaft, the sheet may be slid along the guideway and the stop bars set in the desired position which is retained by friction between the sheet and the guideway.

It will be apparent from the foregoing that it is desirable to mount the regulator above described with the unsupported length of the curtain 32 extending horizontally. In this position, the force of gravity assists in maintaining the curtain properly centered edgewise in the duct so that the curtain always moves freely wihout danger of frictional binding against the duct walls. While it is preferred to mount the unit for downwardly bulging of the curtain as in the form shown in FIGS. 1 to 3, the unit may be inverted and disposed as shown in FIGS. 5 and 6. In this position, the curtain bulges upwardly and such bulging increases with the supply pressure.

While the roller mounting above described is preferred in order to minimize the overall length of the unit and facilitate its mounting within the main duct, it will be apparent that the curtain 32 may be supported in other ways for movement longitudinally of the duct and tensioned by other types of springs. For example, as shown in FIG. 7, the upstream end portion of the curtain may rest on a fixed horizontal bar 70 extending transversely across the duct between the top and bottom walls thereof. The curtain thus stretched out along the duct is attached at its upstream end to the ends of contractile springs 71 whose other ends may be adjustably secured to a cross-bar 72. The curtain thus mounted acts as before in regulating the area of the opening by varying the forward bulging of the unsupported length between the bar 70 and the flange 26.

I claim as my invention:

1. The combination, of a duct of rectangular cross-section adapted for the forced flow of air therethrough in one direction, a shaft disposed within and extending across said duct, means supporting said shaft to turn about its longitudinal axis, an elongated rectangular and flexible curtain substantially equal in width to said duct and having one end portion wound around said shaft, an intermediate unwound length of said curtain extending downstream along the duct, means securing the downstream end of said curtain to the duct along a straight line paralleling said shaft and laterally spaced inwardly from one side wall of the duct, said side wall cooperating with the opposed side surface of said curtain to form a chamber opening upstream and downstream while being substantially closed around its sides by virtue of the narrow clearance between the side edges of the curtain and the walls of the duct, means cooperating with the other side surface of said curtain to define a second chamber opening upstream but closed at its downstream end adjacent said line to create a drop between the static pressures in said second and first chambers during the forced flow of air through said duct, a perforated partition extending across the downstream end of said first chamber and providing a backing for rolling of the curtain toward and away from said line to vary the area of the outlet from the first chamber, said intermediate portion of said curtain bulging laterally under said pressure drop, and yieldable means continuously acting on said shaft and tending to wind up the curtain thereon with a force which balances said static pressure drop between said second and first chambers while allowing winding and unwinding of the curtain in accordance with decreases and increases in such pressure drop due to changes in the pressure of the air delivered into said duct.

2. An air flow regulator as defined in claim 1 including a stop projecting upstream from said partition and acting to limit the bulging of said curtain across said first chamber whereby to prevent complete covering of the outlet of the chamber by the curtain in response to an increase in said pressure drop.

3. An air flow regulator as defined in claim 1 in which said yieldable means is of the torsion type coiled about the axis of said shaft.

4. An air flow regulator as defined in claim 1 including an annular surface rotatable with said shaft and a friction shoe yieldably pressed against said surface to exert friction force damping oscillations of said shaft.

5. An air flow regulator as defined in claim 1 including means responsive to turning of said shaft to apply a force thereto for damping oscillations of the shaft.

References Cited in the file of this patent

UNITED STATES PATENTS

| | | |
|---|---|---|
| 930,158 | Connet | Aug. 3, 1909 |
| 1,529,680 | Ackerman | Mar. 17, 1925 |
| 2,822,132 | McDonald et al. | Feb. 4, 1958 |
| 2,906,287 | Kreuttner | Sept. 29, 1959 |
| 2,911,002 | Larkfeldt | Nov. 3, 1959 |
| 2,950,733 | Perkins | Aug. 30, 1960 |

FOREIGN PATENTS

| | | |
|---|---|---|
| 897,639 | Germany | Nov. 23, 1953 |